Patented June 10, 1952

2,599,864

UNITED STATES PATENT OFFICE 2,599,864

WAVE FRONT MODIFYING WAVE GUIDE SYSTEM

Robert Bruce Robertson-Shersby-Harvie, Malvern, and Richard G. Garfitt, Sale, England Application July 31, 1947, Serial No. 765,104
In Great Britain June 20, 1945

Section 1, Public Law 690, August 8, 1946
Patent expires June 20, 1965

5 Claims. (Cl. 250—33.63)

This invention relates to wireless aerial systems and is more particularly concerned with arrangements by which the radiation reception characteristic or polar diagram of an aerial system operating at ultra-high-frequencies may be modified so as to conform to a particular requirement.

The object of the invention is to provide means by which the polar diagram relating to an electro-magnetic waveguide orifice or horn, or a mirror reflecting E. M. waves, may readily be modified as desired.

In an aerial system according to the invention the wave paths into or out of a waveguide orifice or horn, or a mirror or like E. M. wave conducting or reflecting device are divided into two or more zones in one of which a progressive retardation of phase is set up by the introduction into the wave paths through such zone of a suitable shaped member e. g. a prism, of dielectric material whose dielectric constant is different from that of the surrounding dielectric medium whereby the said paths are displaced angularly with respect to those of the other zone or zones.

In order that the nature of the invention may be more readily understood embodiments thereof will now be described by way of example with reference to the accompanying drawings in which.

Figure 1:
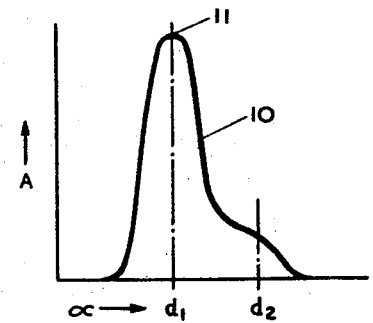
Figure 1 is a graph showing a typical unsymmetrical polar diagram required for an aerial system.

Figure 1 indicates at 10 the desired polar diagram for an aerial system, A representing intensities and $\alpha$ the corresponding angles. This polar diagram has a large amplitude peak 11 occurring at angle $d_1$ and then extends so as to cover, at progressively decreasing amplitude, angles in the range $d_1$—$d_2$. Such polar diagram, it will be noted, is not symmetrical about the direction of maximum amplitude i. e., the angle of $d_1$.

Figure 2:
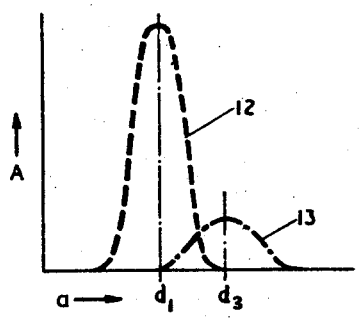
Figure 2 is a graph similar to that of Figure 1 showing resolution of the unsymmetrical polar diagram into two symmetrical components.

Figure 2 indicates how the polar diagram of Figure 1 may be regarded as the resultant of two beams, each symmetrical, one shown at 12 being of narrow width and large amplitude and centered upon the angular direction $d_1$ and the other shown at 13 being of greater width and smaller amplitude and centred on the angular direction $d_3$.

It will readily appear that any irregular curve can be broken down into a group of sine waves comprising a fundamental and harmonics according to Fourier's theorem and form a series of symmetrical beams.

These separate beams are provided according to this invention by diverting part of the energy of one beam, say that of beam 12, to form the second beam 13 by suitable shaping and disposition of a dielectric member in the wavepath out of or into a waveguide orifice or horn or a mirror reflecting surface.

Figures 3, 4:
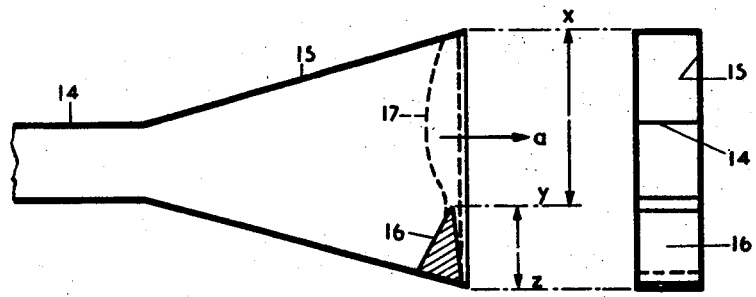
Figures 3 and 4 are longitudinal cross sectional and end elevational views respectively of a waveguide horn embodying the invention.

Referring now to Figures 3 and 4 which show a suitable arrangement for use with a waveguide horn, 14 indicates a rectangular waveguide for use with an $H_{10}$ mode wave and which is flared in the plane which lies normal to the E vector of the wave to form a horn 15.

By proper choice, in known manner, of the angle of divergence of the horn walls the field over the portion $x$—$y$ will have a substantially uniform phase and will provide a narrow beam, free from secondary lobes in the axial direction $a$ of the horn.

A block or prism 16 of dielectric material, such as polystyrene, of substantially triangular cross section is arranged within the mouth of the horn and extends between opposite side walls thereof so as to cover the zone $y$—$z$. Its longitudinal or height axis therefore lies parallel with the E vector of the wave. The block 16 has one of its side surfaces in contact with one of the flared walls of the horn and will cause a progressive phase retardation of the wave energy passing therethrough i. e., over the zone $y$—$z$. It thereby produces a second beam in the direction $b$ angularly displaced from the first. Since the dimension $y$—$z$ is smaller than $x$—$y$ this second beam is also broader and of smaller amplitude than that in direction $a$.

By suitable choice of the size and shape of the prism 16 the separate beams provided may be made to conform to the two components required as shown at 12 and 13 in Figure 2 and to provide a resultant as shown in Figure 1 without serious troughs or gaps due to interference effects over the desired angle.

The above explanation is of simplified character and ignores the higher order waves set up by the discontinuity introduced by the block 16. These higher order waves affect the power distribution across the aperture to some extent and appear to intensify the effect of the dielectric member.

The introduction of the prism 16 may result in an undesired broadening of the major amplitude beam due to reduction of the aperture dimension $x-y$ providing this beam. This may be corrected by the provision of a further convergent dielectric lens as shown at 17 spanning the aperture $x-y$. This convergent lens may, if desired, be combined with the prism 16 to form a single dielectric member. Such convergent dielectric lens members are known and per se form no part of the present invention.

Figures 5, 6:
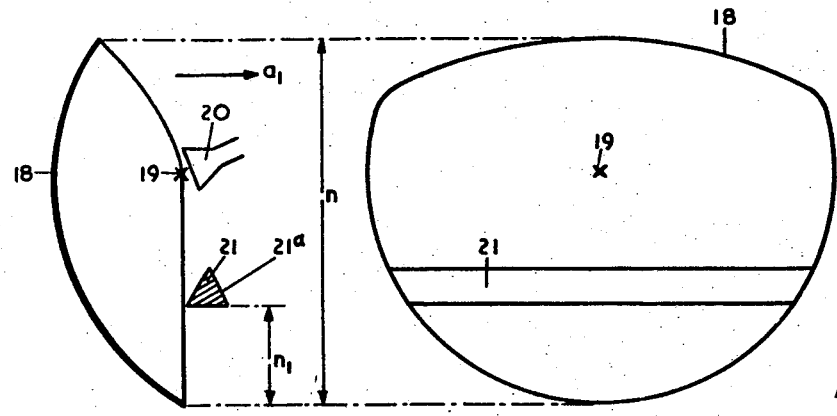
Figures 5 and 6 are cross sectional and front elevational views respectively of a reflecting mirror embodying the invention.

Figures 5 and 6 show another embodiment applied to a reflecting mirror. 18 indicates a reflector shaped as part of a paraboloid at the focal point 19 of which is located a suitable E. M. wave feeding member in the form of a waveguide orifice or horn 20. The major part of the energy provided by the feed member 20 emerges after reflection by the mirror surface 18, as a narrow beam of high intensity in the direction $a1$. A portion of the reflected energy however, i. e., that intercepted by a prism 21 disposed in front of the mirror surface, is scattered to form a broad beam of small amplitude in the direction $b1$, i. e., divergent from the main beam $a1$. Such an arrangement can be made to provide a polar diagram similar to that illustrated in Figure 1.

It is necessary to choose the prism dimensions and also its position as shown by the dimension $n_1$ with respect to the main aperture dimension $n$ so that the two beams combine in the proper phase relationship over the region where they overlap.

The above described arrangement relies upon normal reflection and diffraction for producing the broadened and diverted beam. Further increase in the angular coverage provided by the mirror surface or the like may be obtained by using partial internal reflection from the front face $21a$ of the prism to produce another broad beam emergent from the lower face of the prism.

The invention is not limited to the direct association of the dielectric member with a wave guide horn or reflector as above described. The dielectric member may be displaced from the horn or mirror by any desired distance provided it falls within the zone illuminated by the energy passing into or out of the waveguide or mirror.

We claim:

1. An ultra high frequency antenna system for producing a radiation pattern having asymmetrical characteristics in a chosen plane comprising a principal field modifying means having a hollow surface producing a symmetrical radiation pattern in the chosen plane and at least one secondary field modifying means having a symmetrical radiation pattern in said plane, said individual symmetrical patterns combining to form a desired asymmetrical pattern in said plane and an electric lens positioned in the path of energy projected from said principal field modifying means.

2. An ultra high frequency antenna system for producing a radiation pattern having asymmetrical characteristics in a chosen plane comprising a principal field modifying means having a hollow surface producing a symmetrical radiation pattern in the chosen plane and at least one secondary field modifying means having a symmetrical radiation pattern in said plane, said individual symmetrical patterns combining to form a desired asymmetrical pattern in said plane and an electric lens means positioned in the path of energy projected from said principal modifying means and combined with said secondary field modifying means in a single structure, said lens being so positioned with respect to said radiator as to focus energy rays received therefrom.

3. An ultra-high frequency antenna system for producing an asymmetrical radiation characteristic in a chosen plane and comprising a radiating device having a substantially symmetrical radiation characteristic per se in said chosen plane, a dielectric block positioned in the path of a portion of the energy leaving said radiating device and extending in a direction perpendicular to said chosen plane, said dielectric block having a prismatic cross-section in said chosen plane, said radiating device comprising a wave guide horn terminating a rectangular wave guide adapted to convey electromagnetic waves of $H_{10}$ mode and wherein said horn is flared in a plane lying normal to the E vector of the electromagnetic wave and in which said dielectric material extends in a direction parallel to said E vector and a dielectric lens positioned in the path of at least a portion of the electromagnetic energy leaving said wave guide horn.

4. The combination set forth in claim 3, in which said dielectric lens is combined with said dielectric block to form a single structure.

5. The combination set forth in claim 4, said dielectric block being arranged with one of its surfaces in contact with one of the flared walls of said horn.

ROBERT BRUCE ROBERTSON-
                        SHERSBY-HARVIE.
RICHARD G. GARFITT.

REFERENCES CITED

The following references are of record in the file of this patent:

UNITED STATES PATENTS

| Number | Name | Date |
|---|---|---|
| Re. 23,003 | Barrow | May 25, 1948 |
| 2,129,669 | Bowen | Sept. 13, 1938 |
| 2,129,712 | Southworth | Sept. 13, 1938 |
| 2,142,648 | Linder | Jan. 3, 1939 |
| 2,273,447 | Ohl | Feb. 17, 1942 |
| 2,283,568 | Ohl | May 19, 1942 |
| 2,283,935 | King | May 26, 1942 |
| 2,429,601 | Biskeborn et al. | Oct. 28, 1947 |
| 2,433,368 | Johnson | Dec. 30, 1947 |
| 2,438,343 | McClellan | Mar. 23, 1948 |
| 2,455,403 | Brown | Dec. 7, 1948 |

FOREIGN PATENTS

| Number | Country | Date |
|---|---|---|
| 678,010 | Germany | June 24, 1939 |
| 706,661 | Germany | May 31, 1941 |